(12) United States Patent
Sato et al.

(10) Patent No.: US 10,434,735 B2
(45) Date of Patent: Oct. 8, 2019

(54) METHOD FOR MANUFACTURING PNEUMATIC TIRE

(71) Applicant: The Yokohama Rubber Co., LTD., Tokyo (JP)

(72) Inventors: Shun Sato, Hiratsuka (JP); Hideki Seto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 590 days.

(21) Appl. No.: 15/137,929

(22) Filed: Apr. 25, 2016

(65) Prior Publication Data

US 2016/0339659 A1 Nov. 24, 2016

Related U.S. Application Data

(62) Division of application No. 14/237,852, filed as application No. PCT/JP2012/059503 on Apr. 6, 2012, now abandoned.

(30) Foreign Application Priority Data

Aug. 9, 2011 (JP) .................................. 2011-173627

(51) Int. Cl.
*B29D 30/08* (2006.01)
*B29C 65/00* (2006.01)
(Continued)

(52) U.S. Cl.
CPC .............. *B29D 30/08* (2013.01); *B29C 65/02* (2013.01); *B29C 66/024* (2013.01);
(Continued)

(58) Field of Classification Search
CPC .... B29D 30/0005; B29D 30/06; B29D 30/30; B29D 2030/0682
See application file for complete search history.

(56) References Cited

U.S. PATENT DOCUMENTS

2002/0104413 A1* 8/2002 Adachi ................... B26D 7/27
83/16
2007/0256531 A1 11/2007 Gonzalez et al.
(Continued)

FOREIGN PATENT DOCUMENTS

EP            1 072 395          1/2001
JP          2009241855 A   * 10/2009
(Continued)

*Primary Examiner* — Robert C Dye
*Assistant Examiner* — Cedrick S Williams
(74) *Attorney, Agent, or Firm* — Thorpe North & Western

(57) ABSTRACT

A method for manufacturing a pneumatic tire may include lap-splicing end parts of a laminate sheet in which a sheet obtained from a thermoplastic resin or a thermoplastic resin composition of a thermoplastic resin blended with an elastomer is laminated with a rubber that undergoes vulcanizing adhesion with the thermoplastic resin or the thermoplastic resin composition. After the sheet obtained from the thermoplastic resin or the thermoplastic resin composition is cut into lengths to be supplied for lap-splicing, and at a stage before tire vulcanization molding, distal end parts of the sheet obtained from the thermoplastic resin or the thermoplastic resin composition are sharpened with a thermal treatment.

11 Claims, 3 Drawing Sheets

(51) Int. Cl.
  *B29C 65/02*   (2006.01)
  *B29D 30/42*   (2006.01)
  *B29L 30/00*   (2006.01)
  *B29K 21/00*   (2006.01)
  *B29K 101/12*  (2006.01)

(52) U.S. Cl.
  CPC ...... *B29C 66/0242* (2013.01); *B29C 66/1122* (2013.01); *B29C 66/1282* (2013.01); *B29C 66/1286* (2013.01); *B29C 66/14* (2013.01); *B29C 66/343* (2013.01); *B29C 66/43* (2013.01); *B29C 66/71* (2013.01); *B29C 66/723* (2013.01); *B29C 66/73752* (2013.01); *B29C 66/73921* (2013.01); *B29C 66/0246* (2013.01); *B29C 66/1284* (2013.01); *B29D 2030/423* (2013.01); *B29K 2021/00* (2013.01); *B29K 2101/12* (2013.01); *B29L 2030/00* (2013.01); *B65H 2801/93* (2013.01)

(56) References Cited

U.S. PATENT DOCUMENTS

2010/0193098 A1*  8/2010  Kirino .................... C08L 23/22
                                                        152/450
2011/0061783 A1   3/2011  Rubber

FOREIGN PATENT DOCUMENTS

| WO | WO 2006/037723 | 4/2006 |
| WO | WO 2009/110353 | 9/2009 |

* cited by examiner

METHOD FOR MANUFACTURING PNEUMATIC TIRE

RELATED APPLICATIONS

This application is a divisional application of U.S. patent application Ser. No. 14/237,852, filed Feb. 7, 2014, which is a national stage entry of PCT/JP2012/059503, filed Apr. 6, 2012, which claims priority to Japan Patent Application No. 2011-173627, filed Aug. 9, 2011, each of which are incorporated herein by reference.

TECHNICAL FIELD

The present technology relates to a method for manufacturing a pneumatic tire.

More specifically, the present technology relates to a method for manufacturing a pneumatic tire by cutting, into certain lengths, a laminate sheet in which a sheet obtained from a thermoplastic resin or a thermoplastic resin composition of a thermoplastic resin blended with an elastomer is laminated with a rubber that undergoes vulcanizing adhesion to the thermoplastic resin or the thermoplastic resin composition; splicing the end parts of the laminate sheet; and then performing vulcanization molding; wherein, the pneumatic tire durably demonstrates the characteristics and performance of the laminate sheet over an extended period of time without the generation of cracks in the vicinity of the splice portion of the spliced laminate sheet after a pneumatic tire manufactured with this method begins traveling.

The laminate sheet typically constitutes an inner liner layer that is, for example, one of the important members in recent pneumatic tires. In this case, the present technology relates to a pneumatic tire having an inner liner layer formed with the laminate sheet as described above, and to a method for manufacturing the pneumatic tire with the inner liner layer having superior durability without the generation of cracks in the vicinity of a splice portion of the spliced laminate sheet (inner liner layer) after traveling with the pneumatic tire has begun.

Other than the inner liner layer, the laminate sheet may be used, for example, in an important location in the tire as a member for reducing the weight and improving the strength of the tire without the accompaniment of an excessive increase in mass. In this case, the present technology relates to a method for manufacturing a pneumatic tire that uses a reinforcing sheet formed from the laminate sheet as described above, and to a method for manufacturing a pneumatic tire with the reinforcing sheet having the effect of superior durability without the generation of cracks in the vicinity of a splice portion of the spliced reinforcing sheet.

BACKGROUND

Recently, the use of a sheet-like pneumatic tire inner liner obtained from a thermoplastic resin or a thermoplastic resin composition of a thermoplastic resin blended with an elastomer, has been proposed and studied (Japanese Unexamined Patent Application Publication No. 2009-241855).

When actually using a sheet-like object obtained from the thermoplastic resin or the thermoplastic resin composition of a thermoplastic resin blended with an elastomer in a pneumatic tire inner liner, normally a manufacturing technique of winding a laminate sheet of the sheet obtained from the thermoplastic resin or the thermoplastic resin composition of a thermoplastic resin blended with an elastomer and a rubber (tie rubber) sheet that undergoes vulcanizing adhesion to the sheet-like object obtained from the thermoplastic resin or the thermoplastic resin composition of a thermoplastic resin blended with an elastomer, onto a tire molding drum, performing a lap splice, and then supplying to the tire vulcanization molding process is performed.

However, when a tire is manufactured by winding the abovementioned laminate sheet into a roll winding body, pulling and cutting the laminate sheet into portions of a required length, then winding the cut lengths onto the tire molding drum for lap splicing and then performing vulcanization molding, separation may occur between the sheet obtained from the thermoplastic resin or the thermoplastic resin composition that constitutes the inner liner, and the tie rubber sheet for vulcanizing adhesion with the sheet obtained from the thermoplastic resin or the thermoplastic resin composition, after the tire has started traveling.

When explained with reference to a drawing as illustrated in FIG. 2A, a laminate sheet 1, in which a sheet 2 obtained from a thermoplastic resin or a thermoplastic resin composition of a thermoplastic resin blended with an elastomer is laminated with a tie rubber layer 3, is cut into certain sizes (lengths) with a blade or the like and then lap-spliced on a tire molding drum so that a ring-like lap splice portion S is formed at both end parts of the laminate sheet 1. When one laminate sheet 1 is used, both end parts are lap-spliced so that a ring shape is formed, and when a plurality of laminate sheets 1 are used, the mutual end parts of each of the laminate sheets 1 are lap-spliced together so that one ring shape is formed with the plurality of sheets.

Next, other parts (not shown) required for tire manufacturing are wound and the tire undergoes vulcanization molding with a bladder.

After the vulcanization molding, an inner liner layer 10 is formed including the tie rubber layer 3 and the sheet 2 obtained from the thermoplastic resin or the thermoplastic resin composition of a thermoplastic resin blended with an elastomer, and an exposed portion and a portion embedded in the tie rubber layer of the sheet 2 obtained from the thermoplastic resin or the thermoplastic resin composition are formed in the vicinity of a lap splice part S as illustrated in FIG. 2B.

The phenomenon of the sheet 2 obtained from the thermoplastic resin or the thermoplastic resin composition and the vulcanizing-adhered tie rubber sheet 3 separating is produced where the sheet 2 obtained from the thermoplastic resin or the thermoplastic resin composition is exposed and at a distal end part vicinity 4, and the phenomenon first involves a crack being produced and the crack growing so that the phenomenon of the separation of the sheet 2 continues to grow.

While the above explanation describes the use of the laminate sheet 1 obtained from the tie rubber layer 3 and the sheet 2 obtained from the thermoplastic resin or the thermoplastic resin composition, as the inner liner layer, the same can be said when the laminate sheet 1 is used as a member other than the inner liner layer such as, for example, a reinforcing sheet layer (not shown) disposed over the entire circumferential direction on the tire external periphery side of the inner liner layer. In particular, tire locations in which the laminate sheet is disposed as the reinforcing sheet layer are normally used under severe conditions such as when a load is applied repetitively over a long period of time and these locations often suffer from the problems of the occurrence of cracks and/or separation.

SUMMARY OF THE TECHNOLOGY

Problems to be Solved by the Technology

The present technology provides a method for manufacturing a pneumatic tire having an inner liner layer or a reinforcing sheet layer formed by lap splicing (providing an overlap portion when performing a splice) end parts of a laminate sheet in which a sheet obtained from a thermoplastic resin or a thermoplastic resin composition of a thermoplastic resin blended with an elastomer is laminated with a rubber that undergoes vulcanizing adhesion with the thermoplastic resin or the thermoplastic resin composition, then performing vulcanization molding to form the laminate sheet, wherein, the pneumatic tire favorably demonstrates, with good durability, characteristics and performance of the laminate sheet over an extended period of time without the generation of cracks and/or separation near the spliced portions of the spliced laminate sheet (the inner liner layer or the reinforcing sheet layer) after a pneumatic tire manufactured with this method begins traveling.

A method for manufacturing the pneumatic tire of the present technology may be constituted as follows.

(1) A method for manufacturing a pneumatic tire having a step of lap-splicing end parts of a laminate sheet in which a sheet obtained from a thermoplastic resin or a thermoplastic resin composition of a thermoplastic resin blended with an elastomer, is laminated with a rubber that undergoes vulcanizing adhesion with the thermoplastic resin or the thermoplastic resin composition, wherein, after the sheet obtained from the thermoplastic resin or the thermoplastic resin composition is cut into lengths to be supplied to the lap-splicing step, and at a stage before a tire vulcanization molding step, distal end parts of the sheet obtained from the thermoplastic resin or the thermoplastic resin composition are sharpened with a thermal treatment.

The method for manufacturing the pneumatic tire of the above present technology desirably includes any of the following constitutions (2) to (8).

(2) The method for manufacturing the pneumatic tire described in (1), wherein a temperature of the thermal treatment is at or above the melting point of the thermoplastic resin or the thermoplastic resin composition.

(3) The method for manufacturing the pneumatic tire described in (2), wherein, when the thermal treatment is conducted solely on the sheet obtained from the thermoplastic resin or the thermoplastic resin composition, the thermal treatment is conducted at a temperature at or above the melting point of the thermoplastic resin or the thermoplastic resin composition and at or below (the melting point of the thermoplastic resin or the thermoplastic resin composition+250° C.).

(4) The method for manufacturing the pneumatic tire described in (2), wherein, when the thermal treatment is conducted on the laminate sheet in which the sheet obtained from the thermoplastic resin or the thermoplastic resin composition is laminated with a rubber that undergoes vulcanizing adhesion with the thermoplastic resin or the thermoplastic resin composition, the thermal treatment is conducted at a temperature at or above the melting point of the thermoplastic resin or the thermoplastic resin composition and at or below (the melting point of the thermoplastic resin composition+180° C.).

(5) The method for manufacturing the pneumatic tire described in any of (1) to (4), wherein, the sharpening has a relationship in which a thickness T (mm) at a position at a distance inward by a length of ($t \times \frac{1}{3}$) from the distal end of the sheet obtained from the thermoplastic resin or the thermoplastic resin composition, satisfies $0.1t \leq T \leq 0.8t$.

where, t: average thickness (mm) in the tire circumferential direction of a portion not subject to the sharpening of the sheet obtained from the thermoplastic resin or the thermoplastic resin composition of a thermoplastic resin blended with an elastomer.

T: thickness (mm) at a position at a distance inward by a length of ($t \times \frac{1}{3}$) from the distal end of the sheet obtained from the thermoplastic resin or the thermoplastic resin composition of a thermoplastic resin blended with an elastomer.

(6) The method for manufacturing the pneumatic tire described in any of (1) to (5), wherein, the thermoplastic resin includes at least one type of a polyamide resin, a polyester resin, a polynitrile resin, a polymethacrylate resin, a polyvinyl resin, a cellulose resin, a fluoride resin, and an imide resin.

(7) The method for manufacturing the pneumatic tire described in any of (1) to (6), wherein, the elastomer includes at least one type of a diene-based rubber, a diene-based rubber hydrogenate, a halogen-containing rubber, a silicon rubber, a sulfur-containing rubber, a fluororubber, and a thermoplastic elastomer.

(8) The method for manufacturing the pneumatic tire described in any of (1) to (7), wherein, one or a plurality of the laminate sheets are used, and both end parts are lap-spliced when one sheet is used, and mutual end parts are lap-spliced when a plurality of sheets are used.

According to the present technology described in (1), a method for manufacturing a pneumatic tire is provided, wherein an inner liner layer or a reinforcing sheet layer formed by lap splicing end parts of a laminate sheet in which a sheet obtained from a thermoplastic resin or a thermoplastic resin composition of a thermoplastic resin blended with an elastomer is laminated with rubber that undergoes vulcanizing adhesion with the thermoplastic resin or the thermoplastic resin composition, then performing vulcanization molding to form the laminate sheet, wherein, the pneumatic tire favorably demonstrates, with good durability, characteristics and performance of the laminate sheet over an extended period of time without the generation of cracks and/or separation in the vicinity of the spliced portions of the spliced laminate sheet (the inner liner layer or the reinforcing sheet layer) after a pneumatic tire manufactured with this method begins traveling.

According to the present technology as in (2), a method for manufacturing a pneumatic tire is provided, wherein the method has the effect of the method of the present technology described in (1) and is able to clearly demonstrate the effect.

According to the present technology as in any of (3) to (5), a method for manufacturing a pneumatic tire is provided, wherein the method has the effect of the method of the present technology described in (1) and is able to clearly demonstrate the effect.

According to the present technology as in (6), a method for manufacturing a pneumatic tire is provided, wherein the method has the effect of the method as in (1), and enables the fabrication of a laminate sheet obtained from the thermoplastic resin or the thermoplastic resin composition that, upon the appropriate selection of the thermoplastic resin, satisfies the expected properties of gas permeability, durability, flexibility, heat resistance, or processability, when the laminate sheet is used as a member.

According to the present technology as in (7), a method for manufacturing a pneumatic tire is provided, wherein the method has the effect of the method as in (1), and enables the fabrication of a laminate sheet obtained from the thermoplastic resin or the thermoplastic resin composition that, upon the appropriate selection of an elastomer, satisfies the expected properties of durability, flexibility, or processability, when the laminate sheet is used as a member.

According to the present technology as in (8), a method for manufacturing a pneumatic tire is provided, wherein the method has the effect of the method as in (1), and enables the manufacture of any size of pneumatic tire by appropriately changing an overlap amount (overlapping portion length in tire circumferential direction) of a lap splice part of the laminate sheet and/or appropriately changing the number of laminate sheets used according to the tire size.

DETAILED DESCRIPTION

The following is a detailed description of a method for manufacturing a pneumatic tire of the present technology.

A method for manufacturing a pneumatic tire has a step of lap splicing end parts of a laminate sheet 1 in which a sheet 2 obtained from a thermoplastic resin or a thermoplastic resin composition of a thermoplastic resin blended with an elastomer is laminated with a rubber 3 that undergoes vulcanizing adhesion with the thermoplastic resin or the thermoplastic resin composition, wherein, after the sheet obtained from the thermoplastic resin or the thermoplastic resin composition is cut into lengths to be supplied to the lap-splicing step, and at a stage before a tire vulcanization molding step, distal end parts of the sheet 2 obtained from the thermoplastic resin or the thermoplastic resin composition are sharpened with a thermal treatment.

The inventors made the following discovery, based on the results of various studies on the causes of separation, which is a disadvantage of the conventional methods, between a sheet which constitutes, for example, an inner liner layer, obtained from a thermoplastic resin or a thermoplastic resin composition of a thermoplastic resin blended with an elastomer and a tie rubber sheet that undergoes vulcanizing adhesion with the thermoplastic resin or the thermoplastic resin composition.

Figure 2A:
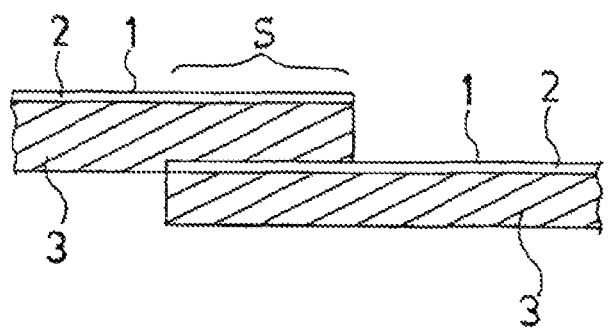
FIG. 2A is a model for illustrating the laminate sheet 1 in which the sheet 2 obtained from the thermoplastic resin or the resin composition is laminated with the rubber 3 that undergoes vulcanizing adhesion with the thermoplastic resin or the resin composition, is cut into certain lengths and subject to the sharpening at the distal ends thereof, both distal ends of the laminate sheet 1 being lap-spliced together.
Figure 2B:
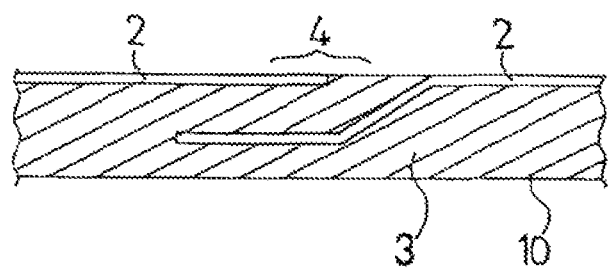
FIG. 2B is a model for illustrating the state illustrated in FIG. 2A after the vulcanization molding.

Specifically, when the abovementioned laminate sheet 1 is prepared with the conventional method, large stress is produced in a rubber part sandwiched from above and below by the sheet 2 that is obtained from the thermoplastic resin or the thermoplastic resin composition of a thermoplastic resin blended with an elastomer and that has significant stiffness, in the vicinity of a lap splice part S at both ends of the laminate sheet 1 as illustrated in FIGS. 2A and 2B, and as a result of the stress, it is thought that cracks are produced at a distal end part vicinity 4 of the sheet 2 obtained from the thermoplastic resin or the thermoplastic resin composition, and separation is produced as the cracks grow larger.

In contrast, the method for manufacturing a pneumatic tire of the present technology includes sharpening with a thermal treatment conducted on the distal end parts of the sheet 2 obtained from the thermoplastic resin or the thermoplastic resin composition, the sharpening being conducted at a stage after cutting the sheet 2 obtained from the thermoplastic resin or the thermoplastic resin composition into lengths to be supplied to the step for lap splicing and before a tire vulcanization molding step.

The sharpening may be conducted in such a way that the sharpening is conducted solely on the sheet 2 obtained from the thermoplastic resin or the thermoplastic resin composition and then the lamination with the rubber 3 is conducted, or may be conducted after the lamination of the sheet 2 obtained from the thermoplastic resin or the thermoplastic resin composition with the rubber 3. In this way, the sharpening may be conducted on the distal end parts of the single sheet 2 obtained from the thermoplastic resin or the thermoplastic resin composition or on distal end parts of the sheet 2 obtained from the thermoplastic resin or the thermoplastic resin composition in a state of being laminated into the laminate sheet 1, generally before the laminate sheet 1 is wound onto the tire molding drum. However, the sharpening may be conducted by conducting the thermal treatment in a green tire state after the laminate sheet 1 has been wound onto the tire molding drum. In this case, while the thermal treatment mainly on the distal end part of the sheet 2 obtained from the thermoplastic resin or the thermoplastic resin composition that is exposed at the outer surface of the splice part (the effect of the process does not extend to the embedded distal end parts), the effect of the sharpening due to the thermal treatment of the present technology is sufficiently demonstrated.

Figure 1A:
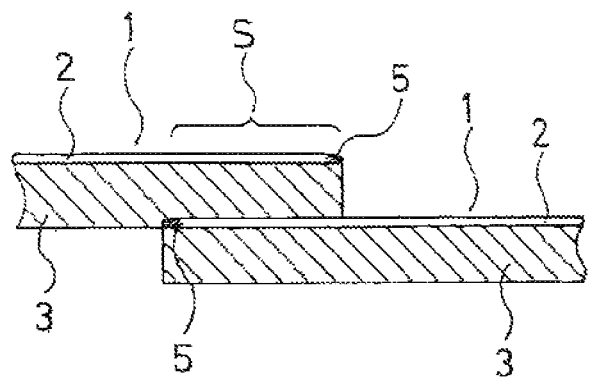
FIG. 1A is a model for illustrating the laminate sheet 1 in which the sheet 2 obtained from the thermoplastic resin or the resin composition is laminated with the rubber 3 that undergoes vulcanizing adhesion with the thermoplastic resin or the resin composition, is cut into certain lengths and sharpened at the distal ends thereof, both distal ends of the laminate sheet 1 being lap-spliced together.

In either case, as illustrated in FIG. 1A, the method of the present technology involves the preparation of a green tire (not shown) having the sheet 2 obtained from the thermoplastic resin or the thermoplastic resin composition of a thermoplastic resin blended with an elastomer for which a sharpened portion 5 is formed in the vicinity of the distal ends thereof.

Figure 1B:
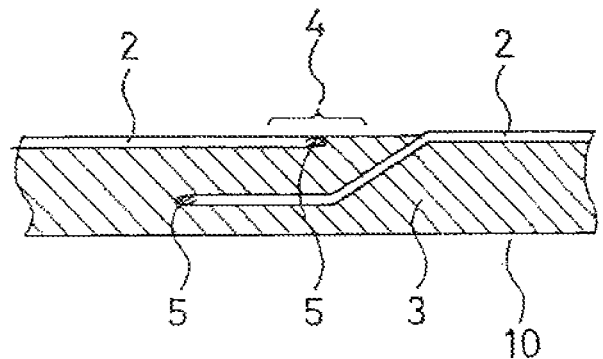
FIG. 1B is a model for illustrating the state illustrated in FIG. 1A after the vulcanization molding.

FIG. 1B is a model illustrating the state illustrated in FIG. 1A after the vulcanization molding.

Due to the formation of the sharpened portion 5 in the vicinity of the distal ends of the sheet 2 obtained from the thermoplastic resin or the thermoplastic resin composition even after the tire vulcanization molding, the thicknesses of the above and below pair of sheets 2 that are obtained from the thermoplastic resin or the thermoplastic resin of a thermoplastic resin blended with an elastomer and that have a large stiffness, become thinner at the distal end part vicinity 4, and moreover, stress due to widening of the surface area of the interface between the sheet 2 and the rubber 3 is distributed and, as a result, stress produced in the rubber part sandwiched between the sheets 2 is reduced and distributed and thus mitigated. After the use of the tire has started, an effect is achieved of preventing the occurrence of the separation phenomenon between the sheet 2 obtained from the thermoplastic resin or the thermoplastic resin composition and the tie rubber sheet 3 that undergoes the vulcanizing adhesion.

Figure 1C:
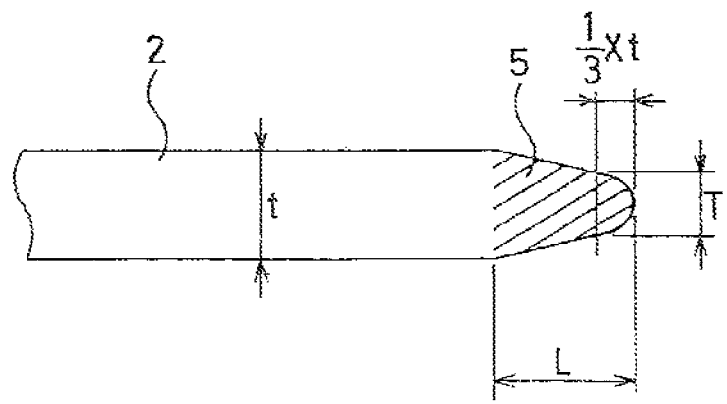
FIG. 1C is an approximate side view for illustrating the sheet 2 (single state) obtained from the thermoplastic resin or the thermoplastic resin composition in which the distal ends thereof are subject to the sharpening.

In the present technology, when the "sharpening with a thermal treatment conducted on the distal end parts of the sheet obtained from the thermoplastic resin or the thermoplastic resin composition" refers merely to the use of a normal blade to cut the sheet obtained from the thermoplastic resin or the thermoplastic resin composition at a normal temperature, while a cut section thereof has a vertical cross-section end surface in the planar direction of the sheet as seen in the sheet width direction (FIG. 2A), the sheet 2 according to the present technology has a sharpened portion 5 in which the cross-section end surface of the sheet 2 is subject to the sharpening to gradually become thinner toward the distal end and the thermal treatment is conducted on the cross-section end parts of the sheet 2 in order to arrive at this profile shape as illustrated by the model in FIGS. 1A to 1C.

The thermal treatment may be performed with any non-contact or contact method. The non-contact method may include applying a burner or a flame to the sheet distal end surface, and the contact method may include applying the sheet distal end surface to a hot roll (heated roller) or a hot plate (heated plate) and the like.

The abovementioned shape "subject to the sharpening to gradually become thinner toward the distal end" may signify a shape in which "roundness" is added in the vicinity of the distal end, and the abovementioned effects of preventing the occurrence of cracks and the occurrence of separation are noticeable even when a shape with roundness is provided. The shape in which the distal end sharpening is conducted on the distal end of the sheet 2 is a shape in which the sharpened form is substantially maintained before and after vulcanization, and thus the effect of preventing the occurrence of cracks and the occurrence of separation is demonstrated after the use as a tire has started.

While the sharpening on the distal ends of the sheet 2 demonstrates the effect even when having roundness as described above, in order to stably achieve a high effect in particular, the sharpening is desirably performed so that a thickness T (mm) at a position located inward by a distance of $(t \times 1/3)$ from the distal end of the sheet 2 obtained from the thermoplastic resin or the thermoplastic resin composition of a thermoplastic resin blended with an elastomer, has a relationship that satisfies $0.1t \leq T \leq 0.8t$. FIG. 1C illustrates this relationship, and the relationship refers to a level of the thickness at the position located a distance of $(t/3)$ from the distal end, and desirably is $0.2t \leq T \leq 0.6t$. Here, t is the average thickness (mm) in the tire circumferential direction of a portion not subject to the sharpening of the sheet 2 obtained from the thermoplastic resin or the thermoplastic resin composition of a thermoplastic resin blended with an elastomer, and T is the thickness (mm) of the sheet 2 at a position at a distance inward by a length of $(t \times 1/3)$ from the distal end of the sheet 2 obtained from the thermoplastic resin or the thermoplastic resin composition of a thermoplastic resin blended with an elastomer.

A length L of the sharpened portion (5 in FIG. 1C) is $L=(1.0 \text{ to } 20) \times t$ (mm), that is, the distal end sharpened part is desirably conducted up to the position at a distance inward by the length L. Desirably, the length is $L=(1.0 \text{ to } 10) \times t$ (mm), or even more desirably, $L=(1.0 \text{ to } 2.5) \times t$ (mm).

While the shape of the sharpened portion desirably forms a cleanly tapered shape in the side cross-sectional shape as illustrated in FIGS. 1A to 1C, since the effect may be achieved even without the cleanly tapered shape, the shape of the sharpened portion may be an asymmetrically tapered shape or a sharp tapered shape, and may have a shape that is curved in one direction (e.g., toward the tie rubber layer), have a somewhat uneven shape, or have a shape provided with the abovementioned roundness.

In the present technology, while the sharpening on the distal ends of the sheet 2 is mainly conducted with the thermal treatment, the formation may also be performed by using a heating and pressurization plate in conjunction.

When the thermal treatment is conducted on the distal end portions of the sheet 2 obtained from the thermoplastic resin composition of a thermoplastic resin blended with an elastomer as in the present technology, a phenomenon occurs in which the elastomer present on the outer surface in the vicinity of the cut ends is covered with a coating of the thermoplastic resin due to the flow of the thermoplastic resin caused by heating. Since the sheet 2 having this form demonstrates a stronger vulcanizing adhesion state than when vulcanizing adhesion occurs when the elastomer is exposed, this feature is also effective in preventing the occurrence of cracks and/or the occurrence of separation in the method of the present technology. Generally, when the elastomer is exposed on the cut section of the laminate sheet, the elastomer hinders the vulcanizing adhesion, and since the vulcanizing adhesion force between the rubber and the sheet obtained from the thermoplastic resin composition is reduced, it is desirable that the distal end is sharpened so that the elastomer is not exposed.

In the present technology, the temperature of the thermal treatment is desirably at or above the melting point of the thermoplastic resin or the thermoplastic resin composition. This is because the process is effective at or above the melting point of the thermoplastic resin or the thermoplastic resin composition to enable the distal ends of the thermoplastic resin or the thermoplastic resin composition to be easily and effectively sharpened.

When the thermal treatment is conducted solely on the sheet obtained from the thermoplastic resin or the thermoplastic resin composition, the thermal treatment may be conducted at a temperature at or above the melting point of the thermoplastic resin or the thermoplastic resin composition and at or below (the melting point of the thermoplastic resin or the thermoplastic resin composition+250° C.). When conducted solely on the sheet, the problems of hardening, degradation, or deterioration and the like do not occur even with a thermal treatment at a relatively high temperature since the laminated rubber is not present.

Conversely, when conducting the thermal treatment on the laminate sheet in which the sheet obtained from the thermoplastic resin or the thermoplastic resin composition is laminated with the rubber, the thermal treatment is desirably conducted at a temperature at or above the melting point of the thermoplastic resin or the thermoplastic resin composition and at or below (the melting point of the thermoplastic resin or the thermoplastic resin composition+180° C.). This is because the thermal treatment is desirably conducted at a relatively low temperature in order to not cause an adverse effect on the rubber due to the thermal treatment when the thermal treatment is conducted on the laminate sheet.

Figure 3:
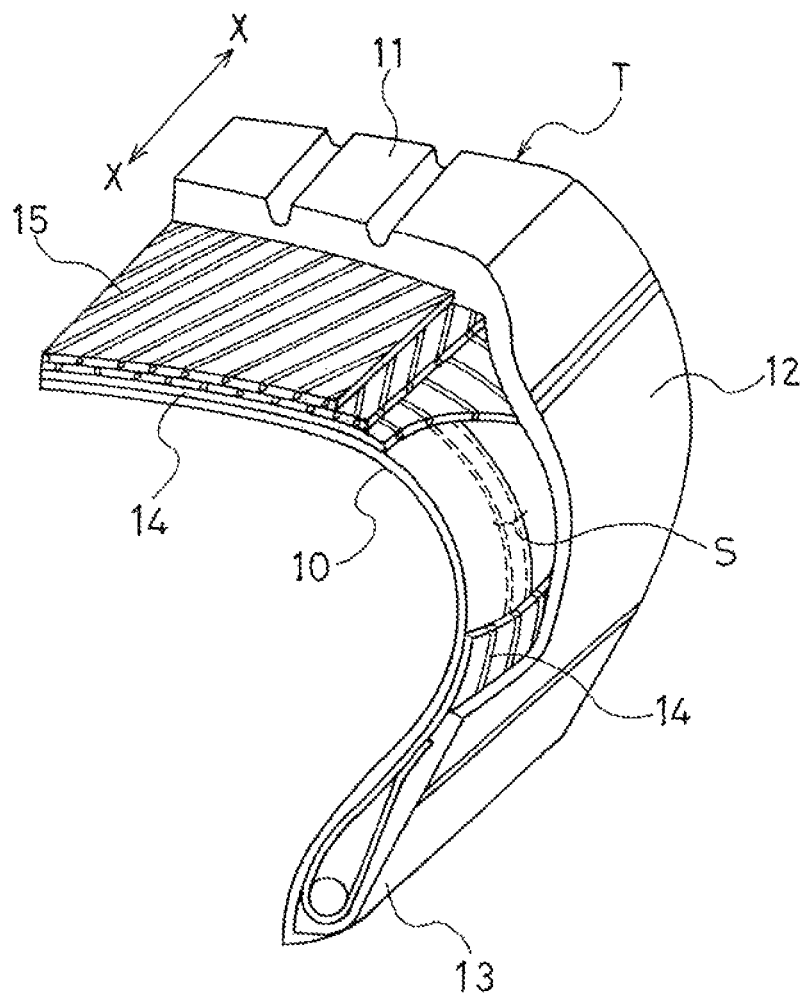

FIG. 3 is a partial fragmented perspective view illustrating one example of an aspect of the pneumatic tire according to the method for manufacturing a pneumatic tire of the present technology.

A pneumatic tire T is provided so that side wall portions 12 and bead portions 13 communicate on the left and right with a tread portion 11. On the tire inner side thereof, a carcass layer 14 that acts as a framework for the tire is provided so as to extend between the left and right bead portions 13 in the tire width direction. Two belt layers 15 composed of steel cords are provided on the outer circumferential side of the carcass layer 14 corresponding to the tread portion 11. The arrow X indicates the tire circumferential direction. An inner liner layer 10 formed by lap splicing according to the method of the present technology is disposed on the inside of the carcass layer 14, and a lap splice part S (both the S of FIG. 1A and FIG. 2A) of the inner liner layer 10 is present and extends in the tire width direction.

In the pneumatic tire according to the present technology, the occurrence of cracks that often occur conventionally in the vicinity of the lap splice part S on the tire inner circumferential surface, and the occurrence of cracks between the tie rubber layer 3 and the sheet 2 obtained from the thermoplastic resin or the thermoplastic resin composition that form the inner liner layer 10, and moreover the occurrence of separation, are suppressed and durability is noticeably improved.

The effect according to the method for manufacturing a pneumatic tire according to the present technology is the same even when an item that has the lap splice part S is used as a reinforcing sheet inside the pneumatic tire instead of being used as the inner liner layer.

While the overlapping length of the lap splice part S depends on the location of use and on the tire size, generally, the length is desirably around 7 to 20 mm, or more desirably around 8 to 15 mm. If the overlapping length is too large, uniformity tends to become worse, and if the overlapping length is too small, there is a risk that the splice part may open during molding.

The laminate sheet is not limited to one sheet and one or more than one sheet may be used. Both ends of the laminate sheet may be lap-spliced when one sheet is used, and mutual end parts may be lap-spliced to form one ring when a plurality of sheets is used. If the overlapping length of the lap splice part S and the number of laminate sheets to be used are both set appropriately, the manufacturing method of the present technology may be applied to a method for manufacturing a pneumatic tire of all dimensions, and the prescribed effect of the present technology may be achieved.

The thermoplastic resin to be used in the present technology is preferably a polyamide resin, [e.g., nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 9T, nylon 6/6T copolymer, nylon 66/PP copolymer, nylon 66/PPS copolymer] and an N-alkoxyalkyl compound thereof, e.g., a methoxymethyl compound of nylon 6, a methoxymethyl compound of a nylon 6/610 copolymer, or a methoxymethyl compound of nylon 612; a polyester resin [e.g., an aromatic polyester such as polybutylene terephthalate (PBT), polyethylene terephthalate (PET), polyethylene isophthalate (PEI), a PET/PEI copolymer, polyarylate (PAR), polybutylene naphthalate (PBN), a crystal polyester, a polyoxyalkylene diimide acid/polybutylene terephthalate copolymer]; a polynitrile resin [e.g., polyacrylonitrile (PAN), polymethacrylonitrile, an acrylonitrile/styrene copolymer (AS), a (meta)acrylonitrile/styrene copolymer, a (meta)acrylonitrile/styrene/butadiene copolymer], a polymethacrylate resin [e.g., polymethyl-methacrylate (PMMA), polyethyl-methacrylic acid], a polyvinyl resin [e.g., vinyl acetate, a polyvinyl alcohol (PVA), a vinyl alcohol/ethylene copolymer (EVOH), polyvinylidene chloride (PDVC), polyvinylchloride (PVC), a vinyl chloride/vinylidene chloride copolymer, a vinylidene chloride/methylacrylate copolymer, a vinylidene chloride/acrylonitrile copolymer (ETFE)], a cellulose resin [e.g., cellulose acetate, cellulose acetate butyrate], a fluoride resin [e.g., polyvinylidene difluoride (PVDF), polyvinyl fluoride (PVF), polychlorofluoroethylene (PCTFE), a tetrafluoroethylene/ethylene copolymer], or an imide resin [e.g., an aromatic polyimide (PI)].

In particular, the thermoplastic resin desirably includes at least one type of polyamide resin, polyester resin, polynitrile resin, polymethacrylate resin, polyvinyl resin, cellulose resin, fluoride resin, or imide resin.

The elastomer and the thermoplastic resin constitute the thermoplastic resin composition used in the present technology, and the abovementioned items may be used as the thermoplastic resin. The elastomer to be used desirably includes a diene-based rubber and a hydrogenate thereof [e.g., natural rubber (NR), isoprene rubber (IR), epoxidized natural rubber, styrene butadiene rubber (SBR), butadiene rubber (BR, high cis-BR, low cis-BR), nitrile rubber (NBR), hydrogenated NBR, hydrogenated SBR], an olefin rubber [e.g., ethylene propylene rubber (EPDM, EPM), maleic acid ethylene propylene rubber (M-EPM), butyl rubber (IIR), an isobutylene and aromatic vinyl or diene-based monomer copolymer, acrylic rubber (ACM), an ionomer], a halogen-containing rubber [e.g., Br-IIR, CI-IIR, a brominated isobutylene-p-methylstyrene copolymer (BIMS), chloroprene rubber (CM), a hydrin rubber (CHR), chlorosulfonated polyethylene rubber (CSM), chlorinated polyethylene rubber (CM), chlorinated polyethylene rubber modified with maleic acid (M-CM)], a silicon rubber [e.g., methyl vinyl silicon rubber, dimethyl silicon rubber, methylphenyl vinyl silicon rubber], a sulfur-containing rubber [e.g., polysulfide rubber], a fluororubber [e.g., a vinylidene fluoride rubber, a vinyl ether rubber containing fluoride, a tetrafluoroethylene-propylene rubber, a silicon-based rubber containing fluoride, a phosphazene rubber containing fluoride], and a thermoplastic elastomer [e.g., a styrene elastomer, an olefin elastomer, an ester elastomer, a urethane elastomer, a polyamide elastomer]. The elastomer includes at least one type of diene rubber, diene rubber hydrogenate, halogen-containing rubber, silicon rubber, sulfur-containing rubber, fluororubber, or thermoplastic elastomer.

Moreover, when the compatibility is different upon blending by combining the previously specified thermoplastic resin and the previously specified elastomer, a suitable compatibility agent may be used as a third component to enable compatibilization of both the resin and the elastomer. By mixing the compatibility agent in the blend, interfacial tension between the thermoplastic resin and the elastomer is reduced, and as a result, the particle diameter of the elastomer that forms the dispersion layer becomes very small and thus the characteristics of both components may be realized effectively. This type of compatibility agent may generally have a structure of a copolymer having a structure of one or both of the thermoplastic resin and the elastomer, or a copolymer having an epoxy group, a carbonyl group, a halogen group, an amino group, an oxazoline group, and/or a hydroxy group or the like that is able to react with the thermoplastic resin or the elastomer. While the type of compatibility agent may be selected according to the type of thermoplastic resin and elastomer to be blended, such a compatibility agent generally includes: a styrene/ethylene butylene block copolymer (SEBS) or a maleic acid modified compound thereof; an EPDM, EPM, EPDM/styrene or EPDM/acrylonitrile graft copolymer or a maleic acid modified compound thereof; a styrene/maleic acid copolymer, or a reactive phenoxy, and the like. The blending quantity of such a compatibility agent, while not being limited, is preferably 0.5 to 10 parts by weight with respect to 100 parts by weight of the polymer component (total of the thermoplastic resin and the elastomer).

A composition ratio of the specific thermoplastic resin and the elastomer in the thermoplastic resin composition of a thermoplastic resin blended with an elastomer, while not limited in particular, may be determined as appropriate to establish a dispersed structure as a discontinuous phase of the elastomer in the matrix of the thermoplastic resin, and is desirably a range of a weight ratio of 90/10 to 30/70.

A compatibility agent of another polymer within a range that does not harm the characteristics required for an inner liner or a reinforcing member may be blended with the thermoplastic resin composition of a thermoplastic resin blended with an elastomer in the present technology. The purposes of mixing such a polymer are to improve the compatibility between the thermoplastic resin and the elastomer, to improve the molding processability of the material, to improve the heat resistance, to reduce cost, and so on. Examples of the material used for the polymer include polyethylene (PE), polypropylene (PP), polystyrene (PS), ABS, SBS, and polycarbonate (PC). Furthermore, a reinforcing agent such as a filler (calcium carbonate, titanium oxide, alumina), carbon black, or white carbon, a softening agent, a plasticizer, a processing aid, a pigment, a dye, or an anti-aging agent generally compounded with polymer compounds may be optionally compounded so long as the characteristics required for an inner liner are not harmed. The thermoplastic resin composition has a structure in which the elastomer is distributed as a discontinuous phase in the matrix of the thermoplastic resin. By adopting such a structure, it becomes possible to provide the inner liner or the reinforcing member with sufficient flexibility and sufficient stiffness that is attributed to the effect of the resin layer as continuous phase. Furthermore, it becomes possible to obtain, during molding, a molding processability equivalent to the thermoplastic resin regardless of the amount of the elastomer.

The Young's moduli of the thermoplastic resin and the elastomer that may be used in the present technology, while not limited in particular, are both preferably 1 to 500 MPa, and more preferably 50 to 500 MPa.

EXAMPLES

Working Examples 1 and 10, Comparative Example 1

A detailed explanation of the method for manufacturing a pneumatic tire of the present technology is provided based on the following working examples.

As illustrated in Table 1, a thermoplastic resin composition having a 50/50 blend of N6/66 as the thermoplastic resin and BIMS as the elastomer, and having a thickness (t) of 0.13 mm and a melting point of 190° C. was prepared as the thermoplastic resin composition sheet.

Tie rubber with a thickness of 0.7 mm and having the composition illustrated in Table 2 was prepared as the tie rubber layer.

TABLE 1

|  |  | Parts by mass |
|---|---|---|
| BIMS[a] | "Exxpro 3035" Made by Exxon Mobile Chemical Co. | 100 |
| Zinc oxide | "Zinc oxide type III" made by Seido Chemical Industry Co., Ltd. | 0.5 |
| Stearic acid | Industrial stearic acid | 0.2 |
| Zinc stearate | "Zinc stearate" made by NOF Corporation | 1 |
| N6/66 | "UBE Nylon 5033B" made by Ube Industries, Ltd. | 100 |
| Modified EEA[b] | "HPR-AR 201" made by Du Pont Mitsui Polychemicals Co., Ltd. | 10 |

Reference:
[a] Brominated isobutylene-p-methylstyrene copolymer
[b] Maleic anhydride modified ethylene - ethylacrylate copolymer

TABLE 2

|  |  | Parts by mass |
|---|---|---|
| Styrene butadiene rubber | Made by Zeon Corporation "Nipol 1502" | 50 |
| Natural rubber | SIR-20 | 50 |
| Carbon black | Made by Tokai Carbon Co., Ltd "Seast V" | 60 |
| Stearic acid | Industrial stearic acid | 1 |
| Aromatic oil | Made by Showa Shell Sekiyu KK Desolex No. 3" | 7 |
| Zinc oxide | "Zinc oxide type III" made by Seido Chemical Industry Co., Ltd. | 3 |
| Modified resorcin formaldehyde condensate | Made by Taoka Chemical Co., Ltd. "Sumikanol 620" | 2 |
| Methylene donor | Modified ether methylolmelamine Made by Taoka Chemical Co., Ltd. "Sumikanol 507 AP" | 6 |
| Sulfur | 5% oil-extension treated sulfur | 6 |
| Vulcanization accelerator | Di-2-benzothiazolyl disulfide Made by Ouchi Shinko Chemical Industrial Co., Ltd. "NOCCELER DM" | 2.2 |

Tests were performed for two cases including a case in which the thermoplastic resin composition sheet was prepared by performing the thermal treatment solely on the sheet after cutting (working examples 1, 2, 3, 4, 6, 8, 10 and comparative example 1), and a case in which the thermoplastic resin composition sheet was laminated with the above tie rubber layer and then cut, and the thermal treatment was performed on the laminated body (working examples 5, 7, 9). The procedures in each case were performed as described below as in (1) and (2).

(1) When the thermal treatment was conducted solely on the sheet:
 (a) the above thermoplastic resin composition sheet was made (t=0.13 mm);
 (b) the thermoplastic resin composition sheet was cut into certain lengths;
 (c) the distal ends of the thermoplastic resin composition sheet were subject to the thermal treatment under the conditions described in Table 3;
 (d) the rubber layer that undergoes vulcanizing adhesion with the thermoplastic resin composition sheet was manufactured;

(e) the laminated body was manufactured by pre-assembly of the thermoplastic resin composition sheet and the rubber layer;
(f) the laminated body was lap-spliced on the molding drum and then vulcanized to manufacture a tire;
(g) the manufactured tire was evaluated after a certain road test.

(2) When the laminated body of the sheet and the rubber were subject to the thermal treatment:
(a) the above thermoplastic resin composition sheet was made (t=0.13 mm);
(b) the rubber layer that undergoes vulcanizing adhesion with the thermoplastic resin composition sheet was manufactured;
(c) the laminated body was manufactured by pre-assembly of the thermoplastic resin composition sheet and the rubber layer;
(d) the obtained laminated body was cut into certain sizes;
(e) the distal ends of the laminated body were subject to the thermal treatment under the conditions described in Table 3;
(f) the laminated body was lap-spliced on the molding drum and then vulcanized to manufacture a tire;
(g) the manufactured tire was evaluated after a certain road test.

The size of the test tires was 215/70R1598H and two samples were fabricated for each working example and comparative example.

The samples were attached to a 15×6.5JJ standard rim conforming to Japan Automobile Tyre Manufacturers Association (JATMA) standards, and the tire pressure was set to the maximum air pressure (240 KPa) according to the JATMA standard.

The evaluation of the tires was conducted by taking samples of the laminate sheet according to the present technology in the inner liner layers in the cavity of the test tires and then comparing the occurrence of cracks and separation in the vicinity of the splice portions and comparing the conditions in other portions of the tire. The pneumatic tires were driven at 7.35 kN for 50,000 km, and then the presence of the occurrence of cracks and the occurrence of separation in the vicinity of the lap splice portions of the inner liner layers in the cavities of the test tires was examined in comparison to the conditions in other portions of the tire.

Results are shown in Table 3. The effects (effect of suppression of cracks and separation) were evaluated in four categories of "excellent," "good," "permissible," and "not permissible."

No problems occurred in particular in the vicinity of the splice portions or in other places after being driven for 50,000 km in the embodiments of the present technology.

The melting points of the thermoplastic resin and the thermoplastic resin composition in the above explanation are values derived according to differential scanning calorimetry (DSC).

TABLE 3

| | Use of thermal treatment | Time of thermal treatment | Treatment temperature | Distal end shape T (mm) | Distal end shape T/t | Result |
|---|---|---|---|---|---|---|
| Comparative Example 1 | No | Single sheet | No | 0.13 | 1.0 | Not permissible |
| Working Example 1 | Present | Single sheet | Melting point + 60° C. | 0.08 | 0.62 | Excellent |
| Working Example 2 | Present | Single sheet | Melting point + 30° C. | 0.09 | 0.69 | Permissible |
| Working Example 3 | Present | Single sheet | Melting point | 0.10 | 0.77 | Permissible |
| Working Example 4 | Present | Single sheet | Melting point + 90° C. | 0.06 | 0.46 | Excellent |
| Working Example 5 | Present | Laminate of sheet/rubber | Melting point + 90° C. | 0.06 | 0.46 | Excellent |
| Working Example 6 | Present | Single sheet | Melting point + 120° C. | 0.04 | 0.31 | Excellent |
| Working Example 7 | Present | Laminate of sheet/rubber | Melting point + 120° C. | 0.04 | 0.31 | Good |
| Working Example 8 | Present | Single sheet | Melting point + 150° C. | 0.03 | 0.23 | Excellent |
| Working Example 9 | Present | Laminate of sheet/rubber | Melting point + 150° C. | 0.03 | 0.23 | Permissible |
| Working Example 10 | Present | single sheet | Melting point + 200° C. | 0.02 | 0.15 | Good |

The invention claimed is:

1. A method for manufacturing a pneumatic tire, comprising:
lap splicing end parts of a laminate sheet comprising a thermoplastic sheet obtained from a thermoplastic resin or a thermoplastic resin composition, the composition comprising a thermoplastic resin blended with an elastomer, and the thermoplastic sheet being laminated with a rubber that undergoes vulcanizing adhesion with the thermoplastic resin or the thermoplastic resin composition; and sharpening distal end parts of the thermoplastic sheet obtained from the thermoplastic resin or the thermoplastic resin composition with a thermal treatment after the thermoplastic sheet obtained from the thermoplastic resin or the thermoplastic resin composition is cut into lengths to be supplied to the lap-splicing step, and at a stage before tire vulcanization molding, before the lap-splicing, and before lamination of the thermoplastic sheet with the rubber, wherein the sharpening has a relationship in which a thickness T (mm) at a position at a distance inward by a length of (t×⅓) from the distal end of the thermoplastic sheet obtained from the thermoplastic resin or the thermoplastic resin composition satisfies the equation 0.1t≤T ≤0.8t, where t: average thickness (mm) in the tire circumferential direction of a portion not subject to the sharpening of the thermoplastic sheet obtained from the thermoplastic resin or the thermoplastic resin composition of a thermoplastic resin blended with an elastomer, and T: thickness (mm) at a position at a distance inward by a length of (t×⅓) from the distal end of the thermoplastic sheet obtained from the thermoplastic resin or the thermoplastic resin composition of a thermoplastic resin blended with an elastomer.

2. The method for manufacturing a pneumatic tire according to claim 1, wherein a temperature of the thermal treatment is at or above the melting point of the thermoplastic resin or the thermoplastic resin composition.

3. The method for manufacturing the pneumatic tire according to claim 2, wherein, the thermoplastic resin or the thermoplastic resin of the thermoplastic resin composition includes at least one type of a polyamide resin, a polyester resin, a polynitrile resin, a polymethacrylate resin, a polyvinyl resin, a cellulose resin, a fluoride resin, or an imide resin.

4. The method for manufacturing the pneumatic tire according to claim 2, wherein, the elastomer includes at least one type of a diene-based rubber, a diene-based rubber hydrogenate, a halogen-containing rubber, a silicon rubber, a sulfur-containing rubber, a fluororubber, or a thermoplastic elastomer.

5. The method for manufacturing a pneumatic tire according to claim 1, wherein, when the thermal treatment is conducted solely on the thermoplastic sheet obtained from the thermoplastic resin or the thermoplastic resin composition, the thermal treatment is conducted at a temperature at or above the melting point of the thermoplastic resin or the thermoplastic resin composition and at or below the melting point of the thermoplastic resin or the thermoplastic resin composition +250° C.

6. The method for manufacturing the pneumatic tire according to claim 5, wherein, the thermoplastic resin includes at least one type of a polyamide resin, a polyester resin, a polynitrile resin, a polymethacrylate resin, a polyvinyl resin, a cellulose resin, a fluoride resin, or an imide resin.

7. The method for manufacturing the pneumatic tire according to claim 5, wherein, the elastomer includes at least one type of a diene-based rubber, a diene-based rubber hydrogenate, a halogen-containing rubber, a silicon rubber, a sulfur-containing rubber, a fluororubber, or a thermoplastic elastomer.

8. The method for manufacturing the pneumatic tire according to claim 1, wherein, the thermoplastic resin or the thermoplastic resin of the thermoplastic resin composition includes at least one type of a polyamide resin, a polyester resin, a polynitrile resin, a polymethacrylate resin, a polyvinyl resin, a cellulose resin, a fluoride resin, or an imide resin.

9. The method for manufacturing the pneumatic tire according to claim 1, wherein, the elastomer includes at least one type of a diene-based rubber, a diene-based rubber hydrogenate, a halogen-containing rubber, a silicon rubber, a sulfur-containing rubber, a fluororubber, or a thermoplastic elastomer.

10. The method for manufacturing the pneumatic tire according to claim 1, wherein, one or a plurality of the laminate sheets are used, and both lapped end parts are lap-spliced when one sheet is used, and mutual lapped end parts are lap-spliced when a plurality of sheets are used.

11. The method for manufacturing the pneumatic tire according to claim 1, wherein:

a temperature of the thermal treatment is at or above the melting point of the thermoplastic resin or the thermoplastic resin composition;

when the thermal treatment is conducted solely on the thermoplastic sheet obtained from the thermoplastic resin or the thermoplastic resin composition, the thermal treatment is conducted at a temperature at or above the melting point of the thermoplastic resin or the thermoplastic resin composition and at or below the melting point of the thermoplastic resin or the thermoplastic resin composition +250° C.;

the thermoplastic resin or the thermoplastic resin of thermoplastic resin composition includes at least one type of a polyamide resin, a polyester resin, a polynitrile resin, a polymethacrylate resin, a polyvinyl resin, a cellulose resin, a fluoride resin, or an imide resin;

the elastomer includes at least one type of a diene-based rubber, a diene-based rubber hydrogenate, a halogen-containing rubber, a silicon rubber, a sulfur-containing rubber, a fluororubber, or a thermoplastic elastomer; and one or a plurality of laminate sheets are used, and both lapped end parts are lap-spliced when one sheet is used, and mutual lapped end parts are lap-spliced when a plurality of sheets are used.

* * * * *